(12) United States Patent
Niemeier et al.

(10) Patent No.: US 7,416,781 B2
(45) Date of Patent: Aug. 26, 2008

(54) COATINGS, METHODS FOR PRODUCING THE SAME, AND THE USE THEREOF

(75) Inventors: Manuela Niemeier, Dremsteinfurt (DE); Andreas Poppe, Münster (DE); Wilfried Stübbe, Greven (DE); Elke Westhoff, Steinfurt (DE); Jens-Dieter Fischer, Münster (DE)

(73) Assignee: BASF Coatings AG, Munster (DE)

( * ) Notice: Subject to any disclaimer, the term of this patent is extended or adjusted under 35 U.S.C. 154(b) by 287 days.

(21) Appl. No.: 10/512,130

(22) PCT Filed: Jul. 5, 2003

(86) PCT No.: PCT/EP03/04767

§ 371 (c)(1),
(2), (4) Date: Oct. 13, 2004

(87) PCT Pub. No.: WO03/095567

PCT Pub. Date: Nov. 20, 2003

(65) Prior Publication Data

US 2005/0233147 A1    Oct. 20, 2005

(30) Foreign Application Priority Data

May 11, 2002 (DE) .............................. 102 21 009

(51) Int. Cl.
*B32B 5/16* (2006.01)
*B05D 1/02* (2006.01)
(52) U.S. Cl. ............... 428/323; 428/328; 428/332; 428/409; 427/385.5; 427/427.4
(58) Field of Classification Search ............... None
See application file for complete search history.

(56) References Cited

U.S. PATENT DOCUMENTS

| | | | |
|---|---|---|---|
| 3,069,375 A | 12/1962 | Bullitt et al. | |
| 5,246,624 A | 9/1993 | Miller et al. | |
| 5,853,809 A | 12/1998 | Campbell et al. | |
| 6,261,645 B1 | 7/2001 | Betz et al. | |
| 6,419,989 B1 | 7/2002 | Betz et al. | |
| 6,620,514 B1 | 9/2003 | Arpac et al. | |
| 6,632,897 B1 | 10/2003 | Geiter et al. | |
| 2003/0125460 A1 | 7/2003 | Kato et al. | |
| 2004/0059053 A1 | 3/2004 | Bremser et al. | |
| 2004/0132902 A1 | 7/2004 | Bremser et al. | |

FOREIGN PATENT DOCUMENTS

| | | |
|---|---|---|
| DE | 3828098 | 3/1990 |
| DE | 3836815 | 7/1990 |
| DE | 19910876 | 10/2000 |
| DE | 19920801 | 11/2000 |
| EP | 365027 | 4/1990 |
| EP | 450625 | 10/1991 |
| WO | WO9712945 | 4/1997 |
| WO | WO9716479 | 5/1997 |
| WO | WO0153107 | 7/2001 |
| WO | WO02055186 | 7/2002 |
| WO | WO03016411 | 2/2003 |
| WO | WO03095532 | 11/2003 |
| WO | WO03095571 | 11/2003 |

OTHER PUBLICATIONS

Abstract for DE19910876 from EPO, Oct. 5, 2000.
Abstract for DE3828098 from EPO, Mar. 8, 1990.
Abstract for DE3836815 from EPO, Jul. 26, 1990.
Abstract for EP365027 from EPO, Apr. 25, 1990.
Abstract for EP450625 from EPO, Oct. 9, 1991.

*Primary Examiner*—Monique R Jackson

(57) ABSTRACT

Transparent coatings with a thickness of at least 30 μm, a relative elastic resilience to DIN 55676 of at least 70%, and a scratch resistance corresponding to a score of not more than 2 in the steel wool scratch test to DIN 1041 after 10 double strokes; process for producing them, and their use.

21 Claims, No Drawings

US 7,416,781 B2

COATINGS, METHODS FOR PRODUCING THE SAME, AND THE USE THEREOF

CROSS REFERENCE TO RELATED APPLICATIONS

This application is a National Phase Application of Patent Application PCT/EP03/04767 filed 7 May 2003, which claims priority to DE 102 21 009.8, filed on 11 May 2002.

FIELD OF THE INVENTION

The present invention relates to novel coatings. The present invention further relates to a process for producing coatings. The present invention additionally relates to the use of the novel coatings for protecting surfaces against damage due to mechanical exposure, particularly against scratches.

PRIOR ART

The protection of surfaces against damage due to mechanical exposure, particularly against scratches, poses numerous serious problems which it has been possible to solve neither to the satisfaction of those in the art nor to the satisfaction of consumers. Through the scratching of their surfaces, economically valuable articles of use, in particular, are persistently harmed in their usefulness, their decorative effect, and their economic value. Moreover, the scratches may present points of attack for further damage or destruction of the articles of use, such as by corrosion, for example.

Affected by these problems in particular are the interior and exterior of motor vehicles or parts thereof, the inside and outside of buildings, furniture, windows and doors, small parts, such as nuts, bolts, hubcaps or wheel rims, coils, containers, packaging, electrical components, such as motor windings or transformer windings, and white goods, such as household appliances, boilers, and radiators, or hollow glassware, such as bottles, flasks, tubes or glasses.

A further problem arises in the development of scratch-resistant coatings for surfaces. Thus, the targeted development of coating materials intended to give scratch-resistant coatings is very complex, since in a material respect there is an absence of the necessary structure/activity relationships between the ingredients of the coating materials on the one hand and the profile of properties of the coatings produced from them. A further complicating factor is that the correlation between important physicochemical and mechanical parameters of coatings, such as glass transition temperature, crystallinity, hardness, plasticity, flexibility, elasticity, brittleness, and film thickness, on the one hand, and scratch resistance, on the other, is unknown in the great majority of cases. The problem becomes even more complex as a result of the fact that scratches are produced in a very wide variety of ways and that coatings react differently to them. For instance, a coating on a motor vehicle, for example, may prove stable to the formation of wash scratches, such as those provoked by the rotating brushes in car wash installations, whereas it is sensitive to scratching caused by flying grains of sand.

Should success nevertheless be achieved in making coatings scratch resistant, this may be to the detriment of other important properties, such as transparency, decorative effect, achievable film thickness, adhesion, chemical resistance, weathering stability, and economics.

In order to be able to assess the scratch resistance of coatings without having to conduct laborious practical tests, it is common to employ alternative investigation methods, such as dynamic mechanical analysis (DMA) or dynamic mechanical thermoanalysis (DMTA), or else a variety of methods for measuring the surface hardness, such as Vickers hardness, pencil hardness, pendulum hardness or micropenetration hardness.

It is at first obvious to correlate the hardness of the surfaces of the coatings that is measured in this way with their scratch resistance. It is found, however, that a simple correlation is not possible (cf., for example, M. Bannert, M. Osterhold, W. Schubert, Th. Brock, in European Coatings Journal, 11, pages 31 ff., 2001). Although very hard surfaces do display outstanding scratch resistance, the coatings in question are brittle, with the consequence frequently of stress cracks, especially when the coatings are cured. This is particularly the case with the coatings known from patent applications DE 199 10 876 A 1, DE 38 36 815 A 1, DE 198 43 581 A1, DE 199 09 877 A1, DE 139 40 858 A1, DE 198 16 136 A 1, EP 0 365 027 A 2 or EP 0 450 625 A 1, based on polysiloxane sols, which are sold, for example, under the brand name Ormocer® (organically modified ceramic). These scratch-resistant coatings can also not be produced in film thicknesses >10 μm, since they then tend toward flaking. Similar comments apply to the coatings known from patent applications EP 0 832 947 A and WO 99/52964 A, which comprise nanoparticles.

A correlation between the results of the DMA of coatings (cf., for example, R. Bethke, K. Schmidt, M. Eder, in Metalloberfläche, vol. 55, page 50 ff., 2001, or E. Frigge, Farbe und Lack, volume 106, number 7, page 78 ff.) or the DMTA (cf. German patent DE 197 09 467 C1) and the scratch resistance is possible. However, with the aid of this correlation it is possible in particular to develop coatings whose surface heals again after scratching, whereas coatings which do not even become scratched, like particularly hard surfaces, can be developed only with difficulty.

Elastomers have a high surface elasticity, so that they are damaged not at all or only with great difficulty by mechanical exposure (cf. K. T. Gillen, E. R. Terrill and R. M. Winter, in Rubber Chemistry and Technology, volume 74, page 428, 2000, or "Zukunftsweisende Technologie in der Mikrohärtebestimmung", publication by Helmut Fischer GmbH, Sindelfingen, Germany). Nevertheless, these materials have little transparency or are not transparent at all, and have a low gloss, so that they are unsuitable for transparent, high-gloss decorative coatings. Moreover, these materials are frequently difficult to coat or overcoat with coating materials.

Thermoset coatings produced from coating materials curable with UV radiation, and having an elastic resilience to DIN 55676 of 75% and 79%, are known from the dissertation by Matthias Walenda, Paderborn College, Prof. Dr. Goldschmidt's group, 1998. Nothing is said concerning a relationship to the scratch resistance.

PROBLEM OF THE INVENTION

It is an object of the present invention to provide novel coatings which are damaged little if at all by mechanical exposure and in particular are scratched little if at all.

The novel scratch-resistant coatings should no longer have the disadvantages of the prior art.

The novel scratch-resistant coatings ought to be transparent and of high gloss so that they are suitable not only for protective purposes but also for decorative purposes. Moreover, the novel scratch-resistant coatings should have particularly high adhesion to the surfaces to be protected or decorated, a very good corrosion protection effect, and also high chemical, solvent, weathering, water, and moisture resistance. They ought to be easy and economic to produce. Not least, they should be able to be produced even in film thicknesses >30 μm, without detriment to their particularly advantageous profile of properties, and they ought to be readily overcoatable, so that they can be refinished in a simple way.

The novel scratch-resistant coatings ought in particular to be suitable for protecting and decorating the inside and outside of motor vehicles or parts thereof, the inside and outside of buildings, furniture, windows and doors, films, small parts, such as nuts, bolts, hubcaps or wheel rims, coils, containers, packaging, electrical components, such as motor windings or transformer windings, and white goods, such as household appliances, boilers, and radiators, or hollow glassware, such as bottles, flasks, tubes or glasses.

It was an object of the present invention not least to find a process which allows the specific production of scratch-resistant coatings without having to carry out laborious practical tests for the development of suitable coating materials.

THE SOLUTION PROVIDED BY THE INVENTION

The invention accordingly provides the novel transparent coatings with a thickness of at least 30 μm, an elastic resilience to DIN 55676 of at least 70%, and a scratch resistance corresponding to a score of not more than 2 in the steel wool scratching test to DIN 1041 after 10 double strokes, said coatings being referred to below as "coatings of the invention".

The invention additionally provides the novel process for producing transparent coatings by applying a coating material to a substrate or to an uncured, part-cured or cured film present thereon, which involves (1) selecting a coating material which following its solidification or curing has an elastic resilience to DIN 55676 of at least 70% and a scratch resistance corresponding to a score of not more than 2 in the steel wool scratching test to DIN 1041 after 10 double strokes, and (2) applying the coating material (1) in one step.

The novel process for producing transparent coatings is referred to below as "process of the invention".

THE ADVANTAGES OF THE SOLUTION PROVIDED BY THE INVENTION

In the light of the prior art it was surprising and unforeseeable for the skilled worker that the object on which the present invention was based could be achieved by means of coatings of the invention and by means of the process of the invention.

In particular it was surprising that comparatively soft materials with a high relative elastic resilience and a comparatively low universal hardness provided the solution according to the invention. On the basis of the selection rule according to the invention it was possible, simply and purposively, to select suitable coating materials which gave the coatings of the invention, without the need for extensive practical tests for that purpose. Accordingly, the development and production of the coatings of the invention proved particularly economic.

The coatings of the invention were highly scratch resistant and transparent. Moreover, they displayed a particularly high level of adhesion to the substrate surfaces to be protected or decorated, a very good corrosion protection effect, and also high chemical, solvent, weathering, water, and moisture resistance.

Not least, they could be produced even in film thicknesses >30 μm without detriment to their particularly advantageous profile of properties.

Their surfaces had very good adhesive properties, so that they were very readily overcoatable and were easy to refinish.

The novel scratch-resistant coatings were therefore outstandingly suitable for protecting and decorating the inside and outside of motor vehicles or parts thereof, the inside and outside of buildings, furniture, windows and doors, films, small parts, such as nuts, bolts, hubcaps or wheel rims, coils, containers, packaging, electrical components, such as motor windings or transformer windings, and white goods, such as household appliances, boilers, and radiators, or hollow glassware, such as bottles, flasks, tubes or glasses.

DETAILED DESCRIPTION OF THE INVENTION

The coatings of the invention have a film thickness of at least 30 μm, preferably at least 40 μm, and in particular at least 50 μm.

They have a relative elastic resilience to DIN 55676 of at least 70%, preferably at least 74%, more preferably at least 78%, with particular preference at least 80%, with very particular preference at least 82%, and in particular at least 84%. Suitable measuring instruments for determining the relative elastic resilience are sold, for example, by Helmut Fischer GmbH, Sindelfingen, Germany (http://www.Helmut-Fischer.com) under the brand name Fischerscope®.

In addition, they have a scratch resistance with a score of not more than 2, in particular 1, on a scale of scores from 1 (no damage) to 6 (very severe damage) in the steel wool scratch test to DIN 1041 after 10 double strokes.

In the creep process, with a force which is adapted to the film thickness and is 25.6 mN, preferably 10 mN, and in particular 5 mN, with a creep time of at least 20 s, the coatings of the invention preferably have a universal hardness to DIN 55676 of <100 N/mm$^2$, more preferably <80 N/mm$^2$, and in particular <60 N/mm$^2$. The average penetration depth ought not to exceed 10% of the film thickness, in order to rule out substrate effects.

Their transmittance for light with a wavelength of between 400 to 700 nm is preferably >90%, more preferably >92%, and in particular >95%.

On degreased float glass and degreased stainless steel 1.4301, they preferably have an adhesion in accordance with DIN ISO 2409 of GT/TT 0/0. On the customary and known pigmented basecoats as well, such as are present in the multicoat color and/or effect paint systems employed in high-grade automotive OEM finishing, they have an adhesion according to DIN ISO 2409 of GT/TT 0/0.

The coatings of the invention may be thermoplastic or thermosetting. The thermoplastic coatings of the invention may be prepared from physically curable coating materials or from thermoplastic materials. The thermosetting coatings of the invention may be prepared from curable coating materials. Preferably, the coatings of the invention are thermosetting.

In accordance with the process of the invention the suitable coating materials are selected such that the coatings produced from them have the properties essential to the invention.

The thermosetting coatings of the invention are preparable from curable coating materials. The curable coating materials may be cured thermally, with actinic radiation, preferably with electromagnetic radiation, such as near infrared (NIR), visible light, UV radiation or X-rays, especially UV radiation, and corpuscular radiation, such as electron beams, or both thermally and with actinic radiation (dual cure). Preferably, the coating materials are thermally curable.

Especially suitable curable coating materials, especially thermally curable coating materials, are composed of organic and inorganic constituents. The curable coating materials preferably have an ignition residue of at least 10% by weight, more preferably at least 15% by weight, and in particular at least 20% by weight.

Thermally curable coating materials of very special suitability comprise an aqueous dispersion with a pH of from 2 to 7, comprising
(A) at least one swellable polymer or oligomer containing anionic and/or potentially anionic and/or nonionic hydrophilic functional groups,
(B) surface-modified, cationically stabilized inorganic nanoparticles of at least one kind, and
(C) at least one amphiphile, or consists thereof.

The dispersion for inventive use has a pH of from 2 to 7, preferably from 2.5 to 7, and in particular from 3 to 6.5. It is set by adding organic and/or inorganic acids which do not enter into any unwanted reactions with the starting products or with the constituents of the dispersion for inventive use, such as precipitation reactions or the decomposition of nanoparticles (B). Examples of suitable acids are formic acid, acetic acid, and hydrochloric acid.

The solids content of the dispersion for inventive use may vary very widely and is guided by the requirements of the case in hand. It is preferably from 10 to 80%, more preferably from 15 to 75%, with particular preference from 20 to 70%, with very particular preference from 25 to 65%, and in particular from 30 to 60% by weight, based in each case on the total amount of the dispersion for inventive use.

The first essential constituent of the dispersion for inventive use is at least one, especially one, swellable polymer or oligomer (A), especially a polymer (A), containing anionic and/or potentially anionic functional groups.

Here and below, polymers are compounds containing on average per molecule more than 10 monomer units. Oligomers are compounds containing on average per molecule from 2 to 15 monomer units. For further details, refer to Römpp Lexikon und Druckfarben, Georg Thieme Verlag, Stuttgart, New York, 1998, page 425, "Oligomers", and page 464, "Polymers".

The anionic and potentially anionic functional groups are preferably selected from the group consisting of carboxylic acid, sulfonic acid, and phosphonic acid groups, acidic sulfuric and phosphoric ester groups, and carboxylate, sulfonate, phosphonate, sulfate ester, and phosphate ester groups, especially carboxylic acid and carboxylate groups.

The amount of anionic and/or potentially anionic functional groups in the polymers and oligomers (A) may vary widely and is guided by the requirements of the case in hand, especially by how many of these groups are needed in order to ensure the swellability of the polymers and oligomers (A) in aqueous media with a pH of from 2 to 7. The amount corresponds preferably to an acid number of from 5 to 70, more preferably from 6 to 60, with particular preference from 7 to 50, with very particular preference from 8 to 40, and in particular from 9 to 30 mg KOH/g. By solids, here and below, are meant the sum of the constituents which form the coatings produced from the dispersion for inventive use.

At a pH of from 2 to 7 the swellable polymers and oligomers (A) have an electrophoretic mobility of preferably $\leq -0.5$, more preferably $\leq -2.0$, $(\mu m/s)/(V/cm)$. The electrophoretic mobility may be determined by means of laser Doppler electrophoresis. As the measuring instrument, the Zetasizer® 3000 from Malvern can be used. Alternatively, microelectrophoretic (microscopic) measurement techniques are appropriate.

The polymers and oligomers (A) are preferably selected from the group of addition copolymers obtainable by single-stage or two-stage or multistage, controlled, free-radical copolymerization in an aqueous or organic medium, particularly in an aqueous medium, and described in detail in German patent application DE 199 30 664 A 1, page 4 line 28 to line 9 line 49. These copolymers (A) may also be prepared by (co)polymerizing a copolymer intermediate, following the addition of small amounts of initiators of free-radical polymerization or without such addition, with at least one olefinically unsaturated monomer.

Into the copolymers (A) it is possible to install reactive functional groups which are able to enter into thermal crosslinking reactions with the complementary reactive functional groups (S 2) described below, in the compounds I, described below. It is also possible to install functional groups which give the copolymers (A) self-crosslinking properties, such as N-methylol or N-alkoxymethyl or N-methylol ether groups. Into the copolymers (A) it is possible not least to install at least one of the reactive functional groups (S 1), described below, which contain at least one bond which can be activated with actinic radiation and which are able to react with the bonds which can be activated with actinic radiation that may be present in the compounds I, described below. Of course, both kinds of reactive functional groups, (S 1) and (S 2), may be installed into the copolymers (A). In that case the copolymers (A) in question are curable thermally and with actinic radiation, something which is also referred to by those in the art as dual cure.

Here and below, actinic radiation means electromagnetic radiation, such as near infrared (NIR), visible light, UV radiation or X-rays, especially UV radiation, and corpuscular radiation, such as electron beams.

The copolymer (A) may therefore contain at least one, preferably at least two, reactive functional groups (S 2) which are able to enter into thermal crosslinking reactions with complementary reactive functional groups (S 2) of the compounds I described below. The reactive functional groups may be introduced into the copolymers (A) by way of the monomers (a) or introduced by means of polymer-analogous reactions following the synthesis of the copolymers. Care should be taken here to ensure that the reactive functional groups (S 2) do not enter into any unwanted reactions with one another or with the aqueous medium, such as unwanted salt forming, the formation of insoluble precipitates, or premature crosslinking, for example, all of which adversely affect the stability of the dispersion for inventive use.

Examples of suitable complementary reactive functional groups (S 2) which are intended for use in accordance with the invention and which enter into crosslinking reactions are compiled in the following overview. In the overview, the variable $R^1$ stands for substituted or unsubstituted alkyl, cycloalkyl, alkylcycloalkyl, cycloalkylalkyl, aryl, alkylaryl, cycloalkylaryl, arylalkyl or arylcycloalkyl radicals.

Overview: Examples of Complementary Reactive Functional Groups (S 2)

| Copolymer (A) and<br>Compound I and | or | Compound I<br>Copolymer (A) |
|---|---|---|
| —SH | | —C(O)—OH |
| —OH | | —C(O)—O—C(O)— |
| | | —NH—C(O)—OR$^1$ |
| | | —CH$_2$—OH |
| | | —CH$_2$—O—CH$_3$ |
| | | —NH—C(O)—CH(—C(O)OR$^1$)$_2$ |
| | | —NH—C(O)—CH(—C(O)OR$^1$)(—C(O)—R$^1$) |
| | | >Si(OR$^1$)$_2$ |
| —C(O)—OH | |  —CH—CH$_2$ (epoxide) |
| —O—C(O)—CR$^5$=CH$_2$ | | —OH |
| —O—CR=CH$_2$ | | —C(O)—CH$_2$—C(O)—R$^1$ |
| | | —CH=CH$_2$ |

Suitable reactors for the (co)polymerization processes include the customary and known stirred tanks, stirred tank cascades, tube reactors, loop reactors or Taylor reactors, as described, for example, in patents DE 198 28 742 A 1 or EP 0 498 583 A 1 or the article by K. Kataoka in Chemical Engineering Science, volume 50, number 9, 1995, pages 1409 to 1416. The free-radical copolymerization is preferably conducted in stirred tanks or Taylor reactors, the Taylor reactors being configured so that the conditions of Taylor flow are met over the entire length of the reactor, even if the kinematic viscosity of the reaction medium changes sharply—in particular, goes up—as a result of the copolymerization (cf. German patent application DE 198 28 742 A 1).

The copolymerization is advantageously conducted at temperatures above room temperature and below the lowest decomposition temperature of the respective monomers used, preference being given to the choice of a temperature range of from 10 to 150° C., with very particular preference from 50 to 120° C., and in particular from 55 to 110° C.

When using particularly volatile monomers the copolymerization may also be conducted under pressure, preferably under from 1.5 to 3 000 bar, more preferably from 5 to 1 500 bar, and in particular from 10 to 1 000 bar.

As regards the molecular weight distribution, there are no restrictions whatsoever imposed on the copolymer (A). Advantageously, however, the copolymerization is guided so as to result in a ratio Mw/Mn, measured by gel permeation chromatography using polystyrene standards, of $\leq 4$, preferably $\leq 2$, and in particular $\leq 1.5$, and also, in certain cases, $\leq 1.3$. The molecular weights of the copolymers (A) can be controlled within wide limits through the choice of the ratio of monomer (a) to monomer (b) to free-radical initiator. In this relationship, it is the amount of monomer (b) in particular which determines the molecular weight, specifically such that the higher the proportion of monomer (b) the lower the resulting molecular weight (cf. in this respect German patent application DE 199 30 664 A 1).

The amount of the copolymer (A) in the dispersion for inventive use may vary widely and is guided by the requirements of the case in hand. In the dispersion for inventive use the copolymer (A) is present preferably in an amount, based on the sum of the essential constituents (A), (B), and (C), of from 1 to 30% by weight.

The further essential constituent of the dispersion for inventive use are surface-modified, cationically stabilized, inorganic nanoparticles (B) of at least one kind, in particular of one kind.

The nanoparticles for modification are preferably selected from the group consisting of main group metals, transition group metals, and their compounds. The main and transition group metals are preferably selected from metals of main groups three to five and transition groups three to six and one and two of the periodic table of the elements, and also the lanthanides. Particular preference is given to using boron, aluminum, gallium, silicon, germanium, tin, arsenic, antimony, silver, zinc, titanium, zirconium, hafnium, vanadium, niobium, tantalum, molybdenum, tungsten, and cerium, especially aluminum, silicon, silver, cerium, titanium, and zirconium.

The compounds of the metals are preferably the oxides, oxide hydrates, sulfates or phosphates.

For use, preference is given to silver, silicon dioxide, aluminum oxide, aluminum oxide hydrate, titanium dioxide, zirconium oxide, cerium oxide, and mixtures thereof, with particular preference silver, cerium oxide, silicon dioxide, aluminum oxide hydrate, and mixtures thereof, with very particular preference aluminum oxide hydrate, and especially boehmite.

The nanoparticles for modification have a primary particle size of preferably <50 nm, more preferably from 5 to 50 nm, in particular from 10 to 30 mm.

The nanoparticles (B) for inventive use, more specifically their surface, are modified with at least one compound of the general formula I: $[(S—)_o\text{-L-}]_m M(R)_n(H)_p$ (I).

In the general formula I the indices and variables have the following meanings:

S is a reactive functional group;
L is an at least divalent organic linking group;
H is a hydrolyzable monovalent group or hydrolyzable atom;
M is a divalent to hexavalent main group or transition group metal;
R is a monovalent organic radical;
o is an integer from 1 to 5, especially 1;
m+n+p is an integer from 2 to 6, especially 3 or 4;
p is an integer from 1 to 6, in particular from 1 to 4;

m and n are zero or an integer from 1 to 5, preferably from 1 to 3, in particular 1, especially
m=1 and n=0.

The modification can take place by physical adsorption of the compounds I onto the surface of the unmodified nanoparticles and/or by chemical reaction of the compounds I with suitable reactive functional groups on the surface of the unmodified nanoparticles. Modification takes place preferably via chemical reactions.

Examples of suitable metals M are those described above.

The reactive functional group S is preferably selected from the group consisting of (S 1) reactive functional groups which contain at least one bond which can be activated with actinic radiation, and (S 2) reactive functional groups which enter into thermally initiated reactions with groups of their own kind ("with themselves") and/or with complementary reactive functional groups. Examples of suitable reactive functional groups (S 2) are those described above, especially epoxide groups.

In the context of the present invention, a bond which can be activated with actinic radiation is a bond which on exposure to actinic radiation becomes reactive and, together with other activated bonds of its kind, enters into polymerization reactions and/or crosslinking reactions which proceed in accordance with radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the inventively preferred reactive group (S 1) contains one double bond or two, three or four double bonds. Where more than one double bond is used, the double bonds may be conjugated. In accordance with the invention, however, it is of advantage if the double bonds are present in isolation, in particular each terminally, within the group (S 1) in question. It is of particular advantage in accordance with the invention to use two double bonds, especially one double bond.

The bonds which can be activated with actinic radiation may be connected to the linking group L by way of carbon-carbon bonds or ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone or sulfoxide groups, but in particular by way of carbon-carbon bonds, carboxylate groups, and ether groups.

Particularly preferred reactive functional groups (S 1) are therefore (meth)acrylate, ethacrylate, crotonate, cinnamate, vinyl ether, vinyl ester, dicyclopentadienyl, norbornenyl, isoprenyl, isopropenyl, allyl or butenyl groups, dicyclopentadienyl ether, norbornenyl ether, isoprenyl ether, isopropenyl ether, allyl ether or butenyl ether groups, or dicyclopentadienyl ester, norbornenyl ester, isoprenyl ester, isopropenyl ester, allyl ester or butenyl ester groups, but especially methacrylate groups (S 1).

The variable H stands for a hydrolyzable monovalent group or for a hydrolyzable atom.

Examples of suitable hydrolyzable atoms are hydrogen atoms and halogen atoms, especially chlorine and bromine atoms.

Preference is given to using the hydrolyzable monovalent groups. Examples of suitable groups of this kind are groups of the general formula II: —X—R (II).

In the general formula II the variable X stands for an oxygen atom, a sulfur atom and/or a group >$NR^2$, in which $R^2$ is an alkyl group having from 1 to 4 carbon atoms, especially methyl, ethyl, propyl, and n-butyl. Preferably, X stands for an oxygen atom.

R stands for a monovalent organic radical. The monovalent radical R may be substituted or unsubstituted; preferably, it is unsubstituted. It may be aromatic, aliphatic or cycloaliphatic. A monovalent radical R is regarded as aromatic when X is connected directly to the aromatic radical. This rule is to be applied mutatis mutandis to the aliphatic and cycloaliphatic radicals. Preference is given to using linear or branched radicals, especially linear radicals, which are aliphatic. Lower aliphatic radicals are more preferred. Of these, very particular preference is given to using the methyl groups or the ethyl groups.

The variable L stands for an at least divalent, especially divalent, organic linking group.

Examples of suitable divalent organic linking groups L are aliphatic, aromatic, cycloaliphatic, and aromatic-cycloaliphatic, and also heteroatoms-containing aliphatic, aromatic, cycloaliphatic, and aromatic-cycloaliphatic, hydrocarbon radicals, such as (1) substituted or unsubstituted, preferably unsubstituted, linear or branched, preferably linear, alkanediyl radicals having from 3 to 30, preferably from 3 to 20, and in particular 3 carbon atoms, which may also contain cyclic groups within the carbon chain, especially trimethylene, tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl preferably tetramethylene, pentamethylene, hexamethylene, heptamethylene, octamethylene, nonane-1,9-diyl, decane-1,10-diyl, 2-heptyl-1-pentylcyclohexane-3,4-bis(non-9-yl), cyclohexane-1,2-, -1,4- or -1,3-bis(methyl), cyclohexane-1,2-, -1,4- or -1,3-bis(eth-2-yl), cyclohexane-1,3-bis(prop-3-yl) or cyclohexane-1,2-, -1,4- or -1,3-bis(but-4-yl);

(2) substituted or unsubstituted, preferably unsubstituted, linear or branched, preferably linear, oxaalkanediyl radicals having from 3 to 30, preferably from 3 to 20, and in particular from 3 to 6 carbon atoms, which within the carbon chain may also contain cyclic groups, especially oxapropane-1,4-diyl, oxabutane-1,5-diyl, oxapentane-1,5-diyl, oxahexane-1,7-diyl or 2-oxapentane-1,5-diyl;

(3) divalent polyester radicals containing repeating polyester units of the formula —(—CO—$(CHR^3)_r$—$CH_2$—O—)—. In this formula the index r is preferably from 4 to 6 and the substituent $R^3$=hydrogen, or an alkyl, cycloalkyl or alkoxy radical. No substituent contains more than 12 carbon atoms;

(4) linear polyether radicals, preferably having an number-average molecular weight of from 400 to 5 000, in particular from 400 to 3 000, which derive from poly(oxyethylene) glycols, poly(oxypropylene) glycols, and poly(oxybutylene) glycols;

(5) linear siloxane radicals, as are present, for example, in silicone rubbers, hydrogenated polybutadiene radicals or polyisoprene radicals, random or alternating butadiene-isoprene copolymer radicals or butadiene-isoprene graft copolymer radicals, which may also contain copolymerized styrene, and also ethylene-propylene-diene radicals;

(6) phen-1,4-, -1,3- or -1,2-ylene, naphth-1,4-, -1,3-, -1,2-, -1,5- or -2,5-ylene, propane-2,2-di(phen-4'-yl), methanedi(phen-4'-yl), biphenyl-4,4'-diyl or 2,4- or 2,6-tolylene; or (7) cycloalkanediyl radicals having from 4 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4''-diyl, especially 3,3,5-trimethylcyclohexane-1,5-diyl or dicyclohexylmethane-4,4'-diyl.

With particular preference, the linking groups L (1) and L (2) are used, with very particular preference trimethylene, tetramethylene, pentamethylene, hexamethylene, heptamethylene, octamethylene, oxapropane-1,4-diyl or 2-oxapentane-1,5-diyl and especially trimethylene, oxapropane-1,4-diyl or 2-oxapentane-1,5-diyl.

In the general formula I, the variable o stands for an integer from 1 to 5, preferably from 1 to 4, more preferably from 1 to 3, and with particular preference 1 and 2. In particular, o is 1.

The compounds I may also be used in complexed form, as is described, for example, in international patent application WO 99/52964, page 8 lines 12 to 20.

The compounds I are customary and known and to a large extent are available commercially. Highly suitable compounds I are known, for example, from international patent application WO 99/52964, page 6 line 1 to page 8 line 20, German patent application DE 197 26 829 A1, column 2 line 27 to column 3 line 38, German patent application DE 199 10 876 A1, page 2 line 35 to page 3 line 12, German patent application DE 38 28 098 A1, page 2 line 27 to page 4 line 43, or European patent application EP 0 450 625 A1, page 2 line 57 to page 5 line 32.

Viewed in terms of its method, the modification of the surface of the nanoparticles offers no special features but instead takes place in accordance with the customary and known processes, which are known, for example, from international patent application WO 99/52964, page 10 line 22 to page 11 line 17 and examples 1 to 20, page 14 line 10 to page 20 line 24, or from German patent application DE 197 26 829 A 1, examples 1 to 6, column 5 line 63 to column 8 line 38. With preference, the proportions specified therein of compounds I to unmodified nanoparticles are employed.

The amount of the surface-modified inorganic nanoparticles (B) in the dispersion for inventive use may vary widely and is guided by the requirements of the case in hand. In the dispersion for inventive use the nanoparticles (B) are present preferably in an amount, based on the sum of the essential constituents (A), (B), and (C), of from 60 to 98% by weight.

The further essential constituent of the dispersion for inventive use is at least one amphiphile (C).

Amphiphiles, as is known, are molecules which have both hydrophilic and lipophilic properties (cf. Römpp Chemie Lexikon, Georg Thieme Verlag, Stuttgart, New York, 9th edition, 1989, volume 1, page 176, "Amphiphile").

The amphiphiles are preferably selected from the group consisting of monoalcohols, especially monoalcohols having from 3 to 6 carbon atoms in the molecule, and aliphatic polyols, especially diols having from 3 to 12 carbon atoms in the molecule.

Examples of highly suitable monoalcohols are propanol, isopropanol, n-butanol, isobutanol, sec-butanol, tert-butanol, amyl alcohol, neopentyl alcohol or n-hexanol.

Examples of suitable diols are propylene glycol, trimethylene glycol, butylene glycol, 1,5-pentanediol, 1,6-hexanediol, and the positionally isomeric diethyloctanediols, such as are known, for example, from German patent application DE 198 09 643 A 1.

Particular preference is given to using propanol, isopropanol, butanol or isobutanol.

The amount of the amphiphiles (C) in the dispersion for inventive use may vary very widely and is guided by the requirements of the case in hand. In the dispersion for inventive use the amphiphiles (C) are present preferably in an amount, based on the sum of the essential constituents (A), (B), and (C), of from 1 to 10% by weight.

Besides the above-described essential constituents, the dispersion for inventive use may further comprise customary coatings constituents.

It is, however, a very particular advantage of the dispersion for inventive use that it yields outstanding coatings even without crosslinking agents or additives.

The preparation of the dispersion for inventive use requires no special methodological procedures but instead takes place in accordance with the customary and known methods of preparing aqueous dispersions, by mixing of the above-described constituents in suitable mixing equipment such as stirred tanks, dissolvers, Ultraturrax, in-line dissolvers, stirred mills or extruders.

The dispersion for inventive use is used to produce the coatings of the invention on primed or unprimed substrates.

Suitable substrates are all surfaces for coating which are not damaged by curing of the coatings present thereon using heat, or heat and actinic radiation. Suitable substrates comprise, for example, metals, plastics, wood, ceramic, stone, textile, fiber assemblies, leather, glass, glass fibers, glass wool and rock wool, mineral-bound and resin-bound building materials, such as plasterboard panels and cement slabs or roof shingles, and composites of these materials. The surfaces of these materials may already have been painted or coated beforehand.

Accordingly, the dispersion for inventive use is especially suitable for the painting of motor vehicle bodies and parts thereof, the interior and exterior of motor vehicles, the inside and outside of buildings, doors, windows and furniture, and also, in the context of industrial coating, for the coating of plastics parts, especially transparent plastics parts, small parts, coils, containers, packaging, electrical components, and white goods, and also for the coating of hollow glassware.

In the case of electrically conductive substrates it is possible to use primers, which are produced in a customary and known manner from electrodeposition coating materials. Both anodic and cathodic electrocoat materials are suitable for this purpose, but especially cathodics.

With the coating of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations to DIN 7728T1) and also polymer blends thereof or the fiber-reinforced composite materials produced using these plastics.

In the case of unfunctionalized and/or a polar substrate surfaces, these may be subjected prior to coating in a known manner to a pretreatment, such as with a plasma or by flaming, or may be provided with a hydroprimer.

Particular advantages are displayed by the dispersion for inventive use and the coatings of the invention in automotive OEM finishing and refinish as clear and transparent, highly scratch-resistant, flexible, acid-resistant and water-resistant, firmly adhering stonechip-resistant clearcoats as part of multicoat color and/or effect paint systems.

The multicoat paint systems of the invention may be produced in a variety of ways in accordance with the invention. Preferably, the wet-on-wet techniques described in German patent application DE 199 30 664 A 1, page 15 lines 36 to 58, are used.

It is a very particular advantage of the coatings of the invention produced from the dispersion for inventive use that they adhere outstandingly to already-cured electrocoats, surfacer coats, basecoats or customary and known clearcoats, so making them of outstanding suitability for automotive refinish or for the scratchproofing of exposed areas of painted automobile bodies.

The dispersion for inventive use may be applied by all customary application methods, such as spraying, knifecoating, brushing, flowcoating, dipping, impregnating, trickling, or rolling, for example. The substrate to be coated may itself be at rest, with the application equipment or unit being moved. Alternatively, the substrate to be coated, especially a coil, may be moved, with the application unit being at rest relative to the substrate or being moved appropriately.

Preference is given to the use of spray application methods, such as compressed-air spraying, airless spraying, high-speed rotation, electrostatic spray application (ESTA), alone or in conjunction with hot spray application such as hot-air spraying, for example. Application may be conducted at temperatures of max. 70 to 80° C., so that suitable application viscosities are achieved without the short-term thermal stress being accompanied by any change in or damage to the dispersion for inventive use or its overspray, which may be intended for reprocessing. For instance, hot spraying may be configured such that the dispersion for inventive use is heated in the spray nozzle for only a very short time, or is heated just a short way upstream of the spray nozzle.

The spray booth used for the application may be operated, for example, with an optionally temperature-controllable circulation system, which is operated with an appropriate absorption medium for the overspray, an example being the dispersion for inventive use itself.

It is of very particular advantage that the coating of the invention can be applied in one step by applying an appropriate coating material, especially the dispersion for inventive use, and need not be constructed from a plurality of discrete coats.

In general, the electrocoat film, surfacer film, basecoat film, and clearcoat film are applied in a wet film thickness such that they cure to give coats having the thicknesses which are necessary and advantageous for their functions. In the case of the electrocoat, this thickness is from 10 to 70, preferably from 10 to 60, with particular preference from 15 to 50, and in particular from 15 to 45 µm; in the case of the surfacer coat, it is from 10 to 150, preferably from 10 to 120, with particular preference from 10 to 100, and in particular from 10 to 90 µm; in the case of the basecoat it is from 5 to 50, preferably from 5 to 40, with particular preference from 5 to 30, and in particular from 10 to 25 µm; and in the case of the inventive clearcoats it is at least 30 to 120, preferably from at least 40 to 100, with particular preference from 50 to 100, and in particular from 60 to 100 µm. It is also possible, however, to employ the multicoat system known from European patent application EP 0 817 614 A1, comprising an electrocoat, a first basecoat, a second basecoat, and an inventive clearcoat, in which the overall coat thickness of the first and second basecoats is from 15 to 40 µm and the coat thickness of the first basecoat is from 20 to 50% of said overall coat thickness.

The surfacer film, basecoat film, and inventive clearcoat film may be cured thermally or both thermally and with actinic radiation (dual cure).

Full curing may take place after a certain rest time. Its duration may be from 30 s to 2 h, preferably from 1 min to 1 h, and in particular from 1 min to 45 min. The rest time serves, for example, for the coating films to flow and undergo devolatilization, or for the evaporation of volatile constituents such as solvents. The rest time may be assisted and/or shortened by the application of elevated temperatures of up to 90° C. and/or by a reduced atmospheric humidity <10 g water/kg air, especially <5 g/kg air, provided this does not entail any damage or change to the coating films, such as premature complete crosslinking, for instance.

The thermal curing has no special features in terms of its method but instead takes place in accordance with the customary and known methods, such as heating in a forced-air oven or irradiation with IR lamps. This thermal curing may also take place in stages. Another preferred curing method is that of curing with near infrared (NIR) radiation. Particular preference is given to employing a process in which the water constituent is removed rapidly from the wet films. Suitable processes of this kind are described, for example, by Rodger Talbert in Industrial Paint & Powder, 04/01, pages 30 to 33, "Curing in Seconds with NIR", or in Galvanotechnik, volume 90 (11), pages 3098 to 3100, "Lackiertechnik, NIR-Trocknung im Sekundentakt von Flüissug-und Pulverlacken".

Advantageously, thermal curing takes place at a temperature of from 50 to 200° C., with particular preference from 60 to 190° C., and in particular from 80 to 180° C., for a time of from 1 min up to 2 h, with particular preference from 2 min up to 1 h, and in particular from 3 min to 45 min.

Furthermore, curing with actinic radiation is preferably conducted with UV radiation and/or electron beams. It is preferred to employ a dose of from 1 000 to 3 000, preferably from 1 100 to 2 900, with particular preference from 1 200 to 2 800, with very particular preference from 1 300 to 2 700, and in particular from 1 400 to 2 600 mJ/cm$^2$. If desired, this curing may be supplemented by actinic radiation from other radiation sources. In the case of electron beams, it is preferred to operate under an inert gas atmosphere. This may be ensured, for example, by supplying carbon dioxide and/or nitrogen directly to the surface of the coating films. When curing with UV radiation, as well, it is also possible to operate under inert gas or an oxygen-depleted atmosphere in order to prevent the formation of ozone.

For curing with actinic radiation, the customary and known radiation sources and optical auxiliary measures are employed. Examples of suitable radiation sources are flashlights from the company VISIT, high-pressure or low-pressure mercury vapor lamps, with or without lead doping in order to open up a radiation window of up to 405 nm, or electron beam sources. The apparatus and conditions for these curing methods are described, for example, in R. Holmes, U. V. and E. B. Curing Formulations for Printing Inks, Coatings and Paints, SITA Technology, Academic Press, London, United Kingdom 1984. Further examples of suitable processes and apparatus for curing with actinic radiation are described in German patent application DE 198 18 735 A1, column 10 lines 31 to 61.

In the case of workpieces of complex shape, such as are envisaged for automobile bodies, those regions not accessible to direct radiation (shadow regions) such as cavities, folds and other structural undercuts may be (partially) cured using pointwise, small-area or all-round emitters, in conjunction with an automated movement means for the irradiation of cavities or edges.

Curing may be carried out in stages, i.e., by means of multiple exposure to light or actinic radiation. It may also be carried out alternatingly; i.e., curing is conducted in alternation with UV radiation and electron beams.

If thermal curing and curing with actinic radiation are employed together, these methods may be used simultaneously or in alternation. If the two curing methods are used in alternation, it is possible, for example, to begin with thermal curing and to end with actinic radiation curing. In other cases it may prove advantageous to begin with curing with actinic radiation and to end with it.

The multicoat paint systems of the invention exhibit an outstanding profile of properties which is very well balanced in terms of mechanics, optics, corrosion resistance, and adhesion. Thus the multicoat paint systems of the invention possess the high optical quality and intercoat adhesion required by the market and do not give rise to any problems such as deficient condensation resistance, cracking (mudcracking) or leveling defects or surface structures in the inventive clearcoats.

In particular, the multicoat paint systems of the invention exhibit an outstanding metallic effect, an excellent D.O.I. (distinctness of the reflected image), an especially high scratch resistance, and an outstanding surface smoothness.

Accordingly, the primed or unprimed substrates of the invention coated with at least one coating of the invention combine a particularly advantageous profile of performance properties with a particularly long service life, so making them particularly valuable economically, esthetically, and technically.

EXAMPLES

Preparation Example 1

The Preparation of a Boehmite Sol 2.78 parts by weight of boehmite (Disperal® P 3 from Sasol Germany GmbH) were added to 25 parts by weight of dilute hydrochloric acid (0.1 N) and the mixture was stirred at room temperature until the boehmite had all dissolved. The colloidal solution was then treated in an ultrasound bath for 5 minutes. This gave a homogeneous boehmite sol.

Preparation Example 2

The Preparation of a Dispersion of a Copolymer (A)

A reaction vessel equipped with a stirrer and 4 feed vessels was charged with 1 361.1 parts by weight of deionized water and this initial charge was heated to 40° C. At this temperature, a mixture of 48.8 parts by weight of methoxypolyethylene glycol methacrylate, 44 parts by weight of methyl methacrylate and 3.6 parts by weight of 1,1-diphenylethylene was metered in from the first feed vessel and a solution of 5.4 parts by weight of ammonium peroxodisulfate in 138.7 parts by weight of deionized water was metered in from the second feed vessel. Thereafter, the reaction mixture was heated to 90° C. At this temperature, a mixture of 246.7 parts by weight of n-butyl methacrylate, 198 parts by weight of styrene, 317.1 parts by weight of hydroxyethyl methacrylate and 222.8 parts by weight of ethylhexyl methacrylate was metered in from the third feed vessel over the course of 4 h. After 2 h of metering, 51.8 parts by weight of polyethylene glycol 400 dimethacrylate were metered in from the fourth feed vessel in parallel for the remaining 2 h. The resulting reaction mixture was further polymerized at 90° C. for 2 h, and then cooled.

Preparation Example 3

The Preparation of a Dispersion of a Copolymer (A)

A reaction vessel equipped with a stirrer and 4 feed vessels was charged with 1 361.1 parts by weight of deionized water and this initial charge was heated to 75° C. At this temperature, three feed streams were metered in, in parallel and simultaneously, over a period of 30 minutes. Feed stream 1 consisted of 24.4 parts by weight of acrylic acid, 44 parts by weight of methyl methacrylate and 3.6 parts by weight of diphenylethylene. Feed stream 2 consisted of a 25 percent strength ammonia solution. Feed stream 3 consisted of a solution of 5.4 parts by weight of ammonium peroxodisulfate in 138.7 parts by weight of deionized water. Following the addition, the resulting reaction mixture was further polymerized at 75° C. for one hour and then heated to 90° C. At this temperature, feed stream 4 was added to the reaction mixture over the course of 4 h. Feed stream 4 consisted of 191.7 parts by weight of n-butyl methacrylate, 153.4 parts by weight of styrene, 93.3 parts by weight of hydroxypropyl methacrylate, 424.9 parts by weight of hydroxyethyl methacrylate, 173.1 parts by weight of ethylhexyl methacrylate and 207.3 parts by weight of a 50 percent strength solution of tris(alkoxycarbonylamino)triazine (TACT®) in n-butanol. The reaction mixture was subsequently further polymerized at 90° C. for 2 h more, and then cooled.

Examples 1 to 5

The Preparation of Coating Materials and Production of Coatings

Example 1

3.3 parts by weight of GLYEO were added to 5.5 parts by weight of the boehmite sol from preparation example 1. The resulting reaction mixture was stirred at room temperature for 90 minutes. Then 2.2 parts by weight of glycidyloxypropyltrimethoxysilane (GLYMO) were added. After two hours of stirring at room temperature, 0.55 part by weight of ethyl acetoacetate (EAA) was added, after which the resulting reaction mixture was stirred at room temperature for 2 h more. Then 0.75 part by weight of isopropanol was added. The resulting reaction mixture was stirred for 15 minutes, 1.25 parts by weight of the dispersion of copolymer (A) from preparation example 2 were added, then stirring was continued at room temperature for 2 h.

Examples 2 to 5

The coating materials of examples 2 to 5 were prepared as for the coating material of example 1. Preparation took place using the starting products indicated in table 1, in the stated amounts. For comparison, the starting products and the amounts in accordance with example 1 are listed.

TABLE 1

The preparation of the coating materials of examples 1 to 5

| Starting products | Examples: | | | | |
|---|---|---|---|---|---|
| | 1 | 2 | 3 | 4 | 5 |
| Boehmite sol from preparation example 1 | 5.5 | 8.5 | 8.5 | 9.35 | 5.5 |
| GLYMO | 2.2 | 1.1 | 1.1 | 1.21 | 2.2 |
| GLYEO | 3.3 | 1.7 | 1.7 | 1.87 | 3.3 |
| EAA | 0.55 | 0.55 | 0.55 | 0.28 | 0.55 |
| Isopropanol | 1.25 | 1.25 | 2 | 2 | — |
| Dispersion from preparation example 2 | 1.25 | 1.25 | 2 | 2 | — |
| Dispersion from preparation example 3 | — | — | — | — | 1.25 |

The coating materials from examples 1 to 5 were applied to substrates made of float glass, using a doctor blade. The resulting films were cured at 140° C. for 22 minutes. The dry film thicknesses are given in table 2.

The coatings of examples 1 to 5 were completely clear and transparent. They had no stress cracks or other surface defects.

Example 6

Dynamomechanical Properties, Scratch Resistance, and Adhesion Properties of the Coatings of Examples 1 to 5

The universal hardness in $N/mm^2$ at 25.6, 10 and 5 mN, the average penetration depth in μm, and the relative elastic resilience in % were measured in accordance with DIN 55676 with the aid of a Fischerscope® H100C from Helmut Fischer GmbH, the force being adapted to the film thickness and the mechanical properties of the coatings so that the penetration depth was not more than 10% of the film thickness.

The adhesion properties were determined in the cross-cut test with adhesive tape tearoff in accordance with DIN ISO 2409.

The steel wool scratch test was carried out using a hammer to DIN 1041 (weight without shaft: 800 g; shaft length: 35 cm). The test panels were stored at room temperature for 24 hours prior to the test.

The flat side of the hammer was wrapped with one ply of steel wool No. 00 from Oscar Weil GmbH, Lahr, Germany, and fastened at the raised sides with tesakrepp tape. The hammer was placed at right angles onto the clearcoats. The head of the hammer was guided in a track over the surface of the clearcoats, without tilting and without additional physical force.

For each test, 10 double strokes were performed in a time of approximately 15 seconds. After every tenth individual test, the steel wool was replaced.

Following exposure, the areas under test were cleaned with a soft cloth to remove the residues of steel wool. The areas under test were evaluated visually under artificial light and awarded the following scores:

| Score | Damage, visual |
|---|---|
| 1 | none |
| 2 | slight |
| 3 | moderate |
| 4 | moderate to middling |
| 5 | severe |
| 6 | very severe |

Evaluation was made immediately after the end of the experiment.

The results are given in table 2. They emphasize the fact that the coatings had an outstanding scratch resistance despite being comparatively soft.

TABLE 2

Dynamomechanical properties, scratch resistance, and adhesion properties of the coatings from examples 1 to 5

| Properties | Examples: | | | | |
|---|---|---|---|---|---|
| | 1 | 2 | 3 | 4 | 5 |
| Dry film thickness [μm] | 44 | 44 | 45 | 41 | 40 |
| Universal hardness [$N/mm^2$] | 19.7 | 29.6 | 29.9 | 29.3 | 22.8 |
| Average penetration depth [μm] | 4.3 | 3.6 | 3.6 | 3.2 | 4.0 |
| Relative elastic resilience [%] | 90 | 84.7 | 80.9 | 80.4 | 82.5 |
| Adhesion in the cross-cut test GT/TT | 0/0 | 0/0 | 0/0 | 0/0 | 0/0 |
| Scratch resistance in the steel wool test (score) | 1 | 1 | 1 | 1 | 1 |

What is claimed is:

1. An article comprising a transparent coating, wherein the coating has a thickness of at least 30 μm, a relative elastic resilience to DIN 55676 of at least 70%, and a scratch resistance corresponding to a score of not more than 2 in a steel wool scratch test according to DIN 1041 after 10 double strokes; and wherein the coating is prepared from a coating material comprising an aqueous dispersion with a pH of from 2 to 7 comprising:
   (A) at least one swellable polymer and/or oligomer containing at least one functional group that is at least one of an anionic functional group, a potentially anionic functional group, and/or a nonionic hydrophilic functional group,
   (B) surface-modified, cationically stabilized inorganic nanoparticles of at least one kind, and
   (C) at least one amphiphile.

2. The article of claim 1, wherein the coating has an elastic resilience of at least 74%.

3. The article of claim 1, wherein the coating has an elastic resilience of at least 78%.

4. The article of claim 1, wherein the coating has a thickness of at least 40 μm.

5. The article of claim 1, wherein the coating has a transmission >90% for light with a wavelength between 400 and 700 nm.

6. The article of claim 1, wherein the coating has an adhesion in accordance with DIN ISO 2409 to degreased float glass and degreased stainless steel 1.4301 of GT/TT 0/0.

7. The article of claim 1, wherein the coating has on a pigmented basecoat an adhesion according to DIN ISO 2409 of GT/TT 0/0.

8. The article of claim 1, wherein the coating is a thermosetting coating.

9. The article of claim 8, wherein the coating is prepared from a curable coating material.

10. The article of claim 9, wherein the coating is thermally curable.

11. The article of claim 9, wherein the curable coating material comprises organic and inorganic constituents.

12. The article of claim 11, wherein the curable coating material has an ignition residue of at least 10% by weight.

13. The article of claim 1, wherein the aqueous dispersion, based on its total amount, has a solids content of up to 60% by weight.

14. The article of claim 1, wherein the aqueous dispersion, based on the sum (A)+(B)+(C), contains
from 1 to 30% by weight of (A),
from 60 to 98% by weight of (B), and
from 1 to 10% by weight of (C).

15. The article of claim 1, wherein the at least one polymer and/or oligomer contains anionic and/or potentially anionic functional groups and has, at a pH of from 2 to 7, an electrophoretic mobility $\leq 0.5$ (μm/s)/(V/cm).

16. The article of claim 1, wherein the inorganic nanoparticles (B) are selected from the group consisting of main group metals, transition group metals, and their compounds.

17. The article of claim 1, wherein the at least one amphiphile is selected from the group consisting of monoalcohols and aliphatic polyols.

18. The article of claim 1, wherein the coating is on a surface of a substrate, and the coating protects the substrate against damage by mechanical exposure and/or provides for decoration of the substrate.

19. The article of claim 18, wherein the substrate is one of a motor vehicle, a motor vehicle part, a building, furniture, a window, a door, an industrial part, a coil, a container, a packaging, an electrical component, a white good, a film or hollow glassware.

20. A process for producing a scratch-resistant coating comprising applying a coating material to a substrate or to an uncured, part-cured, or cured film present thereon, and curing the coating material, wherein the coating material, which following its solidification or curing, has an elastic resilience to DIN 55676 of at least 70% and a scratch resistance corresponding to a score of not more than 2 in a steel wool scratching test according to DIN 1041 after 10 double strokes; and wherein the coating material comprises an aqueous dispersion with a pH of from 2 to 7 comprising:
(A) at least one swellable polymer and/or oligomer containing at least one functional group that is at least one of an anionic functional group, a potentially anionic functional group, and/or a nonionic hydrophilic functional group,
(B) surface-modified, cationically stabilized inorganic nanoparticles of at least one kind, and
(C) at least one amphiphile.

21. The process of claim 20, wherein the coating material is applied by spraying.

* * * * *